W. L. BLISS.
CIRCUIT CONTROLLER.
APPLICATION FILED AUG. 4, 1904.

926,164.

Patented June 29, 1909.

WITNESSES:
Herbert J. Smith
Edwin B. H. Tower, Jr.

INVENTOR.
William L. Bliss
BY Jones Addington
ATTORNEYS.

UNITED STATES PATENT OFFICE.

WILLIAM L. BLISS, OF NEW YORK, N. Y.

CIRCUIT-CONTROLLER.

No. 926,164.   Specification of Letters Patent.   Patented June 29, 1909.

Application filed August 4, 1904. Serial No. 219,460.

*To all whom it may concern:*

Be it known that I, WILLIAM L. BLISS, a citizen of the United States, residing at New York, in the county of Kings and State of New York, have invented new and useful Improvements in Circuit-Controllers, of which the following is a full, clear, concise, and exact description, reference being had to the accompanying drawing, forming a part of this specification.

The present invention relates to improvements in circuit controllers, it being the object of the present invention to provide a circuit controller adapted to permit current to flow in an electric circuit in one direction and to prevent it from flowing in said circuit in the opposite direction.

In accordance with the present invention in its preferred form, an electrolytic valve adapted to permit current to flow in an electric circuit in one direction and to prevent it from flowing in said circuit in the opposite direction, may be provided, a suitable switch being adapted to remove said valve from operative relation with said circuit while the current flows in the former direction and to bring said valve into operative relation with said circuit while current tends to flow in said circuit in the latter direction.

The present invention has been illustrated in the accompanying drawings as applied to a system of electrical distribution, but while it has been illustrated in this way for the purpose of explaining the same, it will be understood that it may be applied to different purposes.

The views in said drawings are as follows:—

Figure 1:
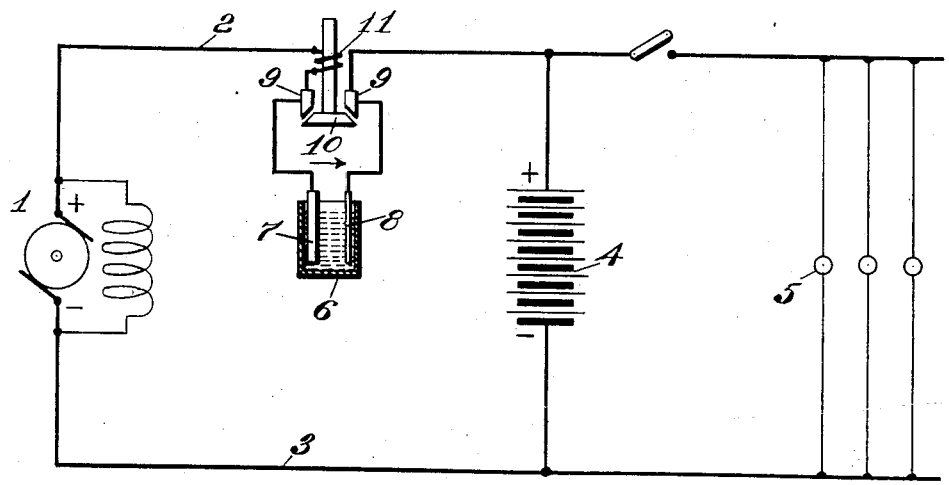
Figure 2:
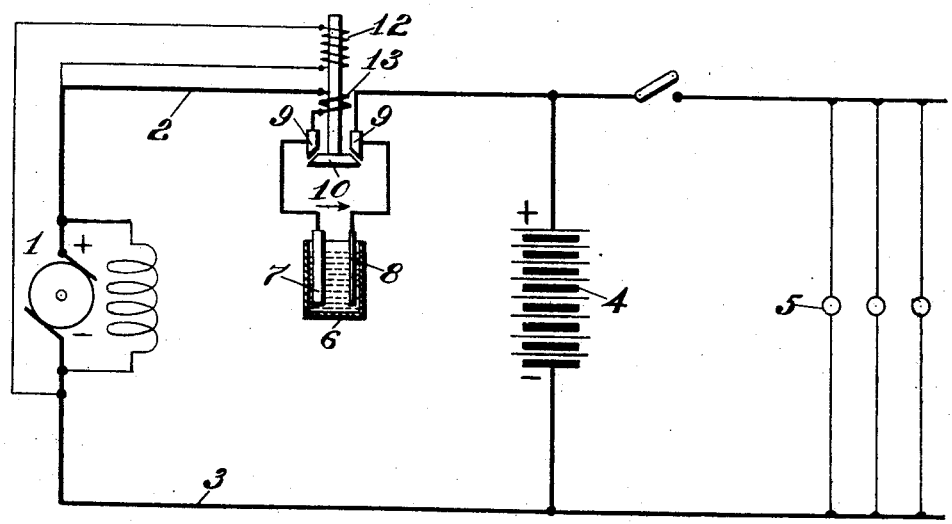

Figure 1 is a diagrammatic view of a system of electrical distribution wherein a circuit controller made in accordance with an embodiment of the present invention is employed, and Fig. 2 is a similar view of said system wherein the automatic switch of the circuit controller assumes another form.

In the system illustrated in the first figure of the drawings, the current may be furnished from a suitable source, such as a generator 1, which may have connected therewith a suitable supply circuit having mains 2 and 3 from which current may be delivered to a storage battery 4 and translating devices 5, 5, said translating devices being connected in parallel with the battery and the generator. When the generator is operative, it will supply current for operating the translating devices, and at the same time it may also supply current for charging the battery. In the event of its doing both, current will flow from the generator 1, through the supply main 2, thence dividingly through the battery 4 and the translating devices 5, and then, after reuniting in the supply main 3, return to the generator. If the generator becomes inoperative, then the battery 4 will furnish the current for operating the translating devices.

The supply circuit may be controlled by an electrolytic valve 6, which may consist of an electrode 7 of iron or other suitable material and an electrode 8 of aluminum or other suitable material, said electrodes being connected with the supply circuit and immersed in an electrolyte which may be a solution of bicarbonate of soda or other suitable material contained within a suitable receptacle or cell. For current to flow through this valve, it must be of such polarity that it may enter the valve by the iron electrode and thence, after flowing through this solution, leave the valve by the aluminum electrode. The electrolytic valve will permit current from the generator to flow through the supply circuit, but as the battery will tend to send current through the supply circuit in the opposite direction to the current which the generator sends therethrough, said valve will prohibit current from the battery from flowing through the supply circuit and the generator. The current in the battery will thus be saved from being uselessly consumed.

The electrolytic valve has associated therewith an automatic switch which may have stationary contacts 9, 9 connected in the supply circuit on opposite sides of the electrolytic valve and a movable contact 10 adapted to bridge said stationary contacts, said movable contact being operated by a solenoid or magnet 11 connected in the supply circuit. When the voltage developed by the generator exceeds that of the battery, the automatic switch will be closed, as then current flowing through the supply circuit from the generator will energize the operating solenoid of the switch. With the switch closed, current from the generator, instead of flowing through the electrolytic valve as at first, will flow around the same through the shunt completed between the stationary contacts 9, 9 by the movable contact 10. As long as the voltage of the generator exceeds that of the battery, the automatic switch will remain closed, but should the generator voltage fall until it becomes practically neutralized by the battery voltage, the automatic switch will open, as then substantially no current will flow through the operating solenoid of said switch.

The electrolytic valve not having to carry the current flowing through the supply circuit for prolonged periods, may be made with small capacity, and, furthermore, there will not be much electrolytic action therein to deteriorate the electrodes and exhaust the electrolyte.

A circuit controller such as has been characterized may be very simple in construction, since no provision need be made therein for protecting the apparatus from arcing, as in a circuit controller, such as a switch, which directly opens and closes the main circuit.

The system illustrated in the second figure of the drawing is the same in most particulars as the system which has just been described, the only difference therein being in the form of the automatic switch which, instead of having a single solenoid or magnet, has a shunt solenoid 12 of fine wire connected across the terminals of the generator and a series solenoid 13 of coarse wire connected in the supply circuit. When the voltage developed by the generator becomes sufficient to overcome the voltage of the battery, the shunt solenoid will respond and close the automatic switch. While current flows through the supply circuit from the generator, the series solenoid will assist the shunt solenoid in keeping the automatic switch closed, but when the generator voltage falls below the battery voltage to a sufficient degree, the series solenoid will become energized by current from the battery flowing backward therethrough, and then as the series solenoid and the shunt solenoid will oppose each other in action, due to the reversal of the polarity of the series solenoid, said switch will be opened.

The forms of the electrolytic valve and the switch and the arrangement thereof illustrated in the drawings have been selected merely for convenience in explaining the present invention, it being understood that the same may assume various forms and be arranged in various ways in accordance with the present invention and with the same ultimate results.

Having thus described my invention, what I claim as new and desire to secure by Letters Patent, is:—

1. In combination, an electrolytic valve adapted to permit current to flow in an electric circuit in one direction and to prevent it from flowing in said circuit in the opposite direction, and a switch operated automatically to remove said valve from operative relation with said circuit when current flows through said circuit.

2. In combination, an electrolytic valve adapted to permit current to flow in an electric circuit in one direction and to prevent it from flowing in said circuit in the opposite direction, and an automatic switch having an operating magnet connected with said circuit and adapted to remove said valve from operative relation with said circuit while the current in said circuit flows in the former direction.

3. In combination, an electric circuit, independent sources of electrical energy tending to reciprocally send current through said circuit in opposite directions, an electrolytic valve adapted to permit current to flow in said circuit in one direction and to prevent it from flowing in said circuit in the opposite direction, and a switch adapted to remove said valve from operative relation with said circuit while current flows in said circuit in the former direction.

4. In combination, a generator, a supply circuit, a storage battery, translating devices adapted to be operated either by said generator or said storage battery, said translating devices and said storage battery being connected with said supply circuit to receive current from the generator therethrough, an electrolytic valve adapted to prevent current from said storage battery from flowing through said circuit, and an automatic switch adapted to remove said valve from operative relation with said circuit while the generator sends current through said circuit and to bring said valve into operative relation with said circuit while the battery tends to send current through said circuit.

5. In combination, an electric circuit wherein the direction of the current may tend to reverse, an electrolytic valve adapted to permit current to flow in said circuit in one direction and to prevent it from flowing in said circuit in the opposite direction, and an automatic switch adapted to remove said valve from operative relation with said circuit while the current in said circuit flows in the former direction and to bring said valve into operative relation with said circuit when the current in said circuit tends to flow in the latter direction, said switch being provided with a shunt solenoid adapted to close said switch when current flows through said circuit in the former direction and a series solenoid adapted to oppose said shunt solenoid when the current commences to flow in said circuit in the latter direction and thereby enable said switch to open.

6. In combination, a generator, a supply circuit, a storage battery, translating devices adapted to be operated either by said generator or said storage battery, said translating devices and said storage battery being connected with said supply circuit to receive current from said generator therethrough, an electrolytic valve adapted to permit current to flow through said circuit from said generator and to prevent current from said battery from flowing through said circuit, and an automatic switch having a shunt solenoid adapted to close said switch when current from said generator flows through said circuit and a series solenoid adapted to oppose said shunt solenoid when current commences to flow through said circuit from said battery and thereby enable said switch to open.

7. A circuit controller comprising an electrolytic valve adapted to permit current to flow in one direction and to prevent it from flowing in the opposite direction, and a switch operated automatically to short circuit said valve when current flows through the circuit controlled thereby.

8. A circuit controller comprising an electrolytic valve adapted to permit current to flow in one direction and to prevent it from flowing in the opposite direction, a switch adapted to short circuit said valve, and an electro magnetic winding for actuating said switch to cause it to short circuit said valve when current flows through the circuit controlled thereby.

9. A circuit controller comprising an electrolytic valve adapted to permit current to flow in one direction and to prevent it from flowing in the opposite direction, a switch adapted to short circuit said valve, and an electro magnetic winding adapted to actuate said switch and arranged in circuit in series with the contacts of said switch said switch being operated by said winding to short-circuit said valve when current flows through the circuit controlled thereby.

10. A circuit controller comprising an electrolytic valve adapted to permit current to flow in one direction and to prevent it from flowing in the opposite direction, a switch adapted to short circuit said valve, and actuating windings for said switch, one of said windings being arranged in series with the contacts of said switch and the other winding being connected in circuit in parallel.

11. A circuit controller comprising an electrolytic valve for controlling an electric circuit, said valve being adapted to permit current to flow in one direction and to prevent it from flowing in the opposite direction, a switch adapted to remove said valve from operative relation with said circuit, and an electro magnetic winding for actuating said switch to short-circuit said valve when current flows through said circuit, said winding being arranged in circuit in series with the switch contacts.

12. A circuit controller comprising an electrolytic valve for controlling an electric circuit, said valve being adapted to permit current to flow in one direction and to prevent it from flowing in the opposite direction, a switch adapted to remove said valve from operative relation with said circuit, and actuating electro magnetic windings for said switch, one of said windings being arranged in circuit in series with the contacts of said switch, and the other being connected in circuit in parallel.

13. A circuit controller comprising an electrolytic valve for controlling an electric circuit, said valve being adapted to permit current to flow in one direction and to prevent it from flowing in the opposite direction, and automatic means for removing said valve from operative relation with said circuit when current flows through said circuit.

14. In a charging system, two conducting paths adapted to form parts of a circuit to be completed through a consumption circuit of predetermined operating polarity, and an electric valve in said circuit, in combination with means for short circuiting the electric valve when continuous direct current of proper polarity flows through said circuit, said means being automatically self-restoring, so as to reopen said short circuit whenever current of such polarity ceases to flow.

15. In a charging system, two conducting paths adapted to form parts of a circuit to be completed through a consumption circuit of predetermined operating polarity, and an electric valve in said circuit, in combination with an electromagnetic circuit controller for short circuiting said valve and having an operating coil connected in series with said valve, so as to be energized only by currents which flow therethrough.

16. In a charging system, two conducting paths adapted to form parts of a circuit to be completed through a consumption circuit of predetermined operating polarity, and an electric valve in said circuit, in combination with a normally open low resistance shunt about said electric valve, and electromagnetic means for closing said shunt, said means being energized by currents flowing through said valve.

In witness whereof, I have hereunto subscribed my name in the presence of two witnesses.

WILLIAM L. BLISS.

Witnesses:
 EDWIN B. H. TOWER, Jr.,
 J. N. ROBERTSON.